(12) United States Patent
Pearson et al.

(10) Patent No.: US 7,482,397 B2
(45) Date of Patent: *Jan. 27, 2009

(54) POLYCARBONATE COMPOSITIONS

(75) Inventors: Jason Clay Pearson, Kingsport, TN (US); Douglas Stephens McWilliams, Kingsport, TN (US); Gether Irick, Jr., Gray, TN (US); Max Allen Weaver, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/204,460

(22) Filed: Aug. 16, 2005

(65) Prior Publication Data

US 2005/0272840 A1    Dec. 8, 2005

(51) Int. Cl.
*C08K 5/3492* (2006.01)

(52) U.S. Cl. ............................ 524/100; 524/96; 524/99

(58) Field of Classification Search ................... 524/96, 524/99, 100, 102, 103; 544/110
See application file for complete search history.

(56) References Cited

U.S. PATENT DOCUMENTS

| | | |
|---|---|---|
| 3,169,121 A | 2/1965 | Goldberg |
| 3,207,814 A | 9/1965 | Goldberg |
| 3,218,372 A | 11/1965 | Okamura et al. |
| 3,953,539 A | 4/1976 | Kawase et al. |
| 4,025,492 A | 5/1977 | Binsack et al. |
| 4,028,527 A | 6/1977 | Thagard |
| 4,088,709 A | 5/1978 | Seymour et al. |
| 4,136,089 A | 1/1979 | Bier et al. |
| 4,156,069 A | 5/1979 | Prevorsek et al. |
| 4,176,224 A | 11/1979 | Bier et al. |
| 4,188,314 A | 2/1980 | Fox et al. |
| 4,194,038 A | 3/1980 | Baker et al. |
| 4,208,527 A | 6/1980 | Horlbeck et al. |
| 4,238,593 A | 12/1980 | Duh |
| 4,331,586 A | 5/1982 | Hardy |
| 4,374,961 A | 2/1983 | Kudo et al. |
| 4,391,954 A | 7/1983 | Scott |
| 4,393,158 A | 7/1983 | Miller |
| 4,401,804 A | 8/1983 | Wooten et al. |
| 4,429,077 A | 1/1984 | Karrer et al. |
| 4,430,484 A | 2/1984 | Quinn |
| 4,452,932 A | 6/1984 | Brunelle |
| 4,452,933 A | 6/1984 | McCready |
| 4,456,717 A | 6/1984 | Eimers et al. |
| 4,465,820 A | 8/1984 | Miller et al. |
| 4,532,290 A | 7/1985 | Jaquiss et al. |
| 4,587,328 A | 5/1986 | Goldberg |
| 4,619,956 A | 10/1986 | Susi |
| 4,786,692 A | 11/1988 | Allen et al. |
| 4,879,355 A | 11/1989 | Light et al. |
| 4,956,407 A | 9/1990 | Funasaki et al. |
| 4,957,953 A | 9/1990 | Kikkawa et al. |
| 4,981,898 A | 1/1991 | Bassett |
| 5,010,146 A | 4/1991 | Kohsaka et al. |
| 5,011,877 A | 4/1991 | Morris et al. |
| 5,116,905 A | 5/1992 | Belfoure et al. |
| 5,134,181 A | 7/1992 | Masina |
| 5,180,762 A | 1/1993 | Canova |
| 5,194,523 A | 3/1993 | Small, Jr. et al. |
| 5,207,967 A | 5/1993 | Small, Jr. et al. |
| 5,239,020 A | 8/1993 | Morris |
| 5,254,610 A | 10/1993 | Small, Jr. et al. |
| 5,283,295 A | 2/1994 | Light et al. |
| 5,354,791 A | 10/1994 | Gallucci |
| 5,420,212 A | 5/1995 | Light |
| 5,441,997 A | 8/1995 | Walsh et al. |
| 5,461,120 A | 10/1995 | Mason et al. |
| 5,478,896 A | 12/1995 | Scott |
| 5,606,007 A | 2/1997 | Sakashita et al. |
| 5,679,733 A | 10/1997 | Malik et al. |
| 5,714,530 A | 2/1998 | Waterman |
| 5,719,217 A | 2/1998 | Gugumus |
| 5,721,298 A | 2/1998 | Waterman |
| 5,744,526 A | 4/1998 | Goossens et al. |
| 5,744,554 A | 4/1998 | Pfaendner et al. |
| 5,907,026 A | 5/1999 | Factor et al. |

(Continued)

FOREIGN PATENT DOCUMENTS

| | | |
|---|---|---|
| EP | 0 272 417 | 6/1988 |
| EP | 0 294 862 | 12/1988 |
| EP | 0 295 730 | 12/1988 |
| EP | 0 466 137 A2 | 1/1992 |
| EP | 0 438 488 A1 | 5/1992 |
| EP | 0 483 488 A1 | 5/1992 |
| EP | 0 537 837 A1 | 4/1993 |
| EP | 0 543 125 | 5/1993 |
| EP | 0 661 342 A1 | 7/1995 |
| EP | 0 675 159 A1 | 10/1995 |

(Continued)

OTHER PUBLICATIONS

Anni Berger-Schunn, "Practical Color Measurement," 1994, pp. 39-56, 91-98, Wiley, NY, Dec. 1994.

(Continued)

*Primary Examiner*—Kriellion A Sanders
(74) *Attorney, Agent, or Firm*—B. J. Boshears; Bernard J. Graves, Jr.

(57) ABSTRACT

This invention relates to polycarbonate compositions comprising:
(A) at least one polycarbonate comprising repeating units derived from a dihydroxyaromatic compound or a dihydroxyaliphatic compound of the formula HO—Y—OH; and
(B) at least one salt prepared from the reaction of one or more acidic phosphorus-containing compounds and one or more hindered amine light stabilizers. The polycarbonate compositions exhibit improved hydrolytic stability.

7 Claims, No Drawings

U.S. PATENT DOCUMENTS

| | | |
|---|---|---|
| 5,922,816 A | 7/1999 | Hamilton |
| 5,942,585 A | 8/1999 | Scott et al. |
| 5,965,261 A | 10/1999 | Webster |
| 5,965,643 A | 10/1999 | Gugumus |
| 6,005,059 A | 12/1999 | Scott et al. |
| 6,011,124 A | 1/2000 | Scott et al. |
| 6,037,424 A | 3/2000 | Scott et al. |
| 6,043,322 A | 3/2000 | Scott et al. |
| 6,051,164 A | 4/2000 | Samuels |
| 6,077,890 A | 6/2000 | Hudson et al. |
| 6,103,796 A | 8/2000 | Stanick et al. |
| 6,107,375 A | 8/2000 | Krishman et al. |
| 6,114,420 A | 9/2000 | Zedda et al. |
| 6,221,556 B1 | 4/2001 | Gallucci et al. |
| 6,254,950 B1 | 7/2001 | Rogers et al. |
| 6,306,939 B1 | 10/2001 | Gupta et al. |
| 6,310,140 B1 | 10/2001 | Raetzsch et al. |
| 6,323,291 B1 | 11/2001 | Mason et al. |
| 6,333,113 B2 | 12/2001 | Sugie et al. |
| 6,348,591 B1 | 2/2002 | Gupta et al. |
| 6,455,616 B1 | 9/2002 | Cogen |
| 6,469,083 B1 | 10/2002 | Opalko |
| 6,476,158 B1 | 11/2002 | England et al. |
| 6,500,887 B1 | 12/2002 | Tobita et al. |
| 6,509,399 B2 | 1/2003 | Gupta et al. |
| 6,545,073 B1 | 4/2003 | Blount |
| 6,569,957 B2 | 5/2003 | Williams et al. |
| 6,653,474 B1 | 11/2003 | Kersjes et al. |
| 6,727,303 B2 | 4/2004 | Ono et al. |
| 6,780,917 B2 | 8/2004 | Hashimoto et al. |
| 2002/0086953 A1 | 7/2002 | Williams et al. |
| 2002/0128357 A1 | 9/2002 | Gossens et al. |
| 2004/0143041 A1 | 7/2004 | Pearson et al. |

FOREIGN PATENT DOCUMENTS

| | | |
|---|---|---|
| EP | 1 304 351 | 4/2003 |
| GB | 1466154 | 3/1977 |
| GB | 1466261 | 3/1977 |
| JP | 04-059852 | 6/1990 |
| JP | 04-011660 | 1/1992 |
| JP | 04-059852 | 2/1992 |
| JP | 10-001602 | 1/1998 |
| JP | 10-298439 | 11/1998 |
| WO | WO 02/053633 A2 | 7/2002 |
| WO | WO 2004/065472 A1 | 8/2004 |

OTHER PUBLICATIONS

"Plastics Adhesive Handbook," 5th Ed, 2001, pp. 98-108, Hanser Gradner Publs., Inc., Cincinnati, OH, Dec. 2001.

Hiemenz, "Polymer Chemistry," 1984, pp. 488-495, Marcel Dekker, NY, Dec. 1987.

Pospisil et al., "Handbook of Polymer Degradation," 2nd ED, 2000, pp. 241-242, S. Halim Hamid Ed., Marcel Dekker, NY, Dec. 2000.

Manas Chanda, "Advanced Polymer Chemistry," 2000, pp. 742-755 and 791-796, Marcel Dekker, NY, Dec. 2000.

Wilfong, "Linear Polyesters," *Journal of Polymer Science*, 1961, pp. 385-410, 54 Dec. 1961.

USPTO Office Action dated Nov. 3, 2005, for U.S. Appl. No. 11/204,864.

USPTO Office Action dated Oct. 6, 2004, for U.S. Appl. No. 10/379,783.

USPTO Office Action dated May 4, 2005, for U.S. Appl. No. 10/379,783.

USPTO Office Action dated Dec. 7, 2004, for U.S. Appl. No. 10/379,649.

USPTO Office Action dated Aug. 3, 2004, for U.S. Appl. No. 10/379,649.

USPTO Office Action dated Aug. 5, 2003, for U.S. Appl. No. 10/382,013.

USPTO Office Action dated Aug. 2, 2004, for U.S. Appl. No. 10/393,475.

USPTO Office Action dated Dec. 7, 2004, for U.S. Appl. No. 10/393,475.

USPTO Office Action dated Oct. 25, 2005, for U.S. Appl. No. 10/392,575.

Copending U.S. Appl. No. 11/204,864, filed Aug. 16, 2005.
Copending U.S. Appl. No. 11/204,869, filed Aug. 16, 2005.
Copending U.S. Appl. No. 10/639,712, filed Mar. 5, 2003.
Copending U.S. Appl. No. 11/204,870, filed Aug. 16, 2005.
Copending U.S. Appl. No. 10/772,121, filed Feb. 4, 2004.
Copending U.S. Appl. No. 11/204,461, filed Aug. 16, 2005.
Copending U.S. Appl. No. 11/204,867, filed Aug. 16, 2005.
Copending U.S. Appl. No. 10/392,575, filed Mar. 20, 2003.

USPTO office action dated Mar. 17, 2006 for copending U.S. Appl. No. 10/772,121.

USPTO office action dated Jul. 20, 2006 for copending U.S. Appl. No. 10/392,575.

USPTO Office Action dated Jul. 28, 2006 for copending U.S. Appl. No. 11/204,864.

USPTO Office Action dated Sep. 8, 2006 for copending U.S. Appl. No. 10/772,121.

USPTO office action dated Sep. 25, 2006 for copending U.S. Appl. No. 10/639,712.

POLYCARBONATE COMPOSITIONS

RELATED APPLICATONS

This application claims priority to and the benefit of the following applications; U.S. Patent Ser. No. 60/439,681 filed Jan. 13, 2003, incorporated herein by reference; and U.S. patent Ser. No. 10/379,649 filed Mar. 5, 2003, incorporated herein by reference.

FIELD OF THE INVENTION

This invention relates to a polymer composition comprising (A) at least one polycarbonate; and (B) one or more salts composed of at least one suitable phosphorus-containing acid and at least one suitable hindered amine light stabilizer.

BACKGROUND OF THE INVENTION

Hydrolytic stability is a physical characteristic commonly sought in polymers. It is therefore desirable to find methods for providing polymer compositions with greater hydrolytic stability and that are less detrimental to process equipment.

U.S. Pat. No. 4,619,956 discloses the combination of 2,2,6,6-tetraalkylpiperidine hindered amine light stabilizers (HALS) and/or their addition salts with triazine ultraviolet absorbers for stabilizing thermoset acrylic and alkyd coatings. U.S. Pat. No. 5,714,530 discloses the utility of combining non-polymeric 2,2,6,6,-tetraalkylpiperidine HALS salts and/or their acid addition salts with triazine ultraviolet light absorbers for stabilizing certain polymer compositions. U.S. Pat. No. 6,051,164 discloses the use of a polymer stabilizing system comprising from about 50 to about 5,000 ppm of at least one ortho hydroxyl tris-aryl triazine light absorber and from about 500 ppm to about 1.25 percent of at least one oligomer, polymeric or high molecular weight HALS having a molecular weight of at least about 500, wherein the weight ratio of HALS to triazine light absorber is from about 3:1 to about 20:1.

The detrimental effect of phosphorus-containing additives on the hydrolytic stability of polycarbonate and polycarbonate-polyester blends is disclosed in U.S. Pat. Nos. 4,456,717, 5,354,791, 5,744,526, 6,103,796, 4,393,158, and 6,107,375. Improved hydrolytic stability for polycarbonates stabilized with phosphorus-containing compounds and siloxanes containing oxetane groups are disclosed in U.S. Pat. No. 4,456,717. Improved hydrolytic stability for polycarbonates stabilized with phosphorus-containing compounds and an oligomer or polymer containing at least one pendant cyclic iminoether group per molecule is disclosed in U.S. Pat. No. 6,107,375. Improved hydrolytic stability for polycarbonates stabilized with phosphorus-containing compounds and an epoxy compound is disclosed in U.S. Pat. No. 4,393,158. Improved hydrolytic stability for polycarbonate-polyester blends stabilized with phosphorus-containing compounds and a polyester having epoxy functionality is disclosed in U.S. Pat. No. 5,354,791. Improved hydrolytic stability for polycarbonates stabilized with phosphorus-containing compounds and hexamethylene tetra amine is disclosed in U.S. Pat. No. 5,744,526. Specifically, U.S. Pat. No. 5,744,526 teaches the addition of the amine to stabilize the phosphite against hydrolysis and consequently improving the hydrolytic stability of the polycarbonate composition.

This present invention relates to polycarbonates and the unexpected improvements in hydrolytic stability for polycarbonates containing an acidic phosphorous compound and a hindered amine light stabilizers (HALS).

SUMMARY OF THE INVENTION

We have discovered that the presence of certain salts in polycarbonates result in polymer compositions that exhibit improved hydrolytic stability and that are less detrimental to process equipment. The salts useful in the present invention are reaction products of a suitable inorganic acid, such as a phosphorous acid, with a suitable hindered amine light stabilizers (HALS).

Thus, the present invention provides a polymer composition comprising:

(A) at least one polycarbonate; and
(B) at least one salt prepared by the reaction of one or more acidic phosphorus-containing compounds with one or more hindered amine light stabilizers.

Another embodiment of the present invention is a polymer concentrate comprising:

(A) at least one polycarbonate; and
(B) up to about 10 weight percent, preferably about 5 to 10 weight percent based on the total weight of the polycarbonate of at least one salt prepared by the reaction of one or more acidic phosphorus-containing compounds and one or more hindered amine light stabilizers.

DETAILED DESCRIPTION OF THE INVENTION

The present invention provides a polymer composition comprising:

(A) at least one polycarbonate; and
(B) a salt prepared by the reaction of one or more acidic phosphorus-containing compounds with one or more hindered amine light stabilizers, wherein the phosphorus-containing compounds are selected from compounds having the formula:

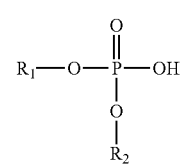

(1)

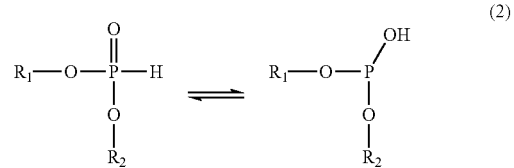

(2)

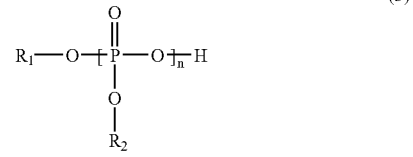

(3)

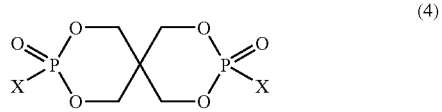

(4)

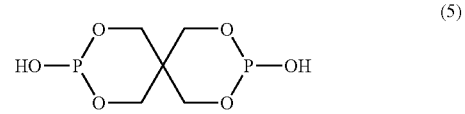

(5)

wherein
- $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- n is 2 to 500; and
- X is selected from hydrogen and hydroxy;
and wherein the hindered amine light stabilizers (HALS) selected from compounds having the formulas:
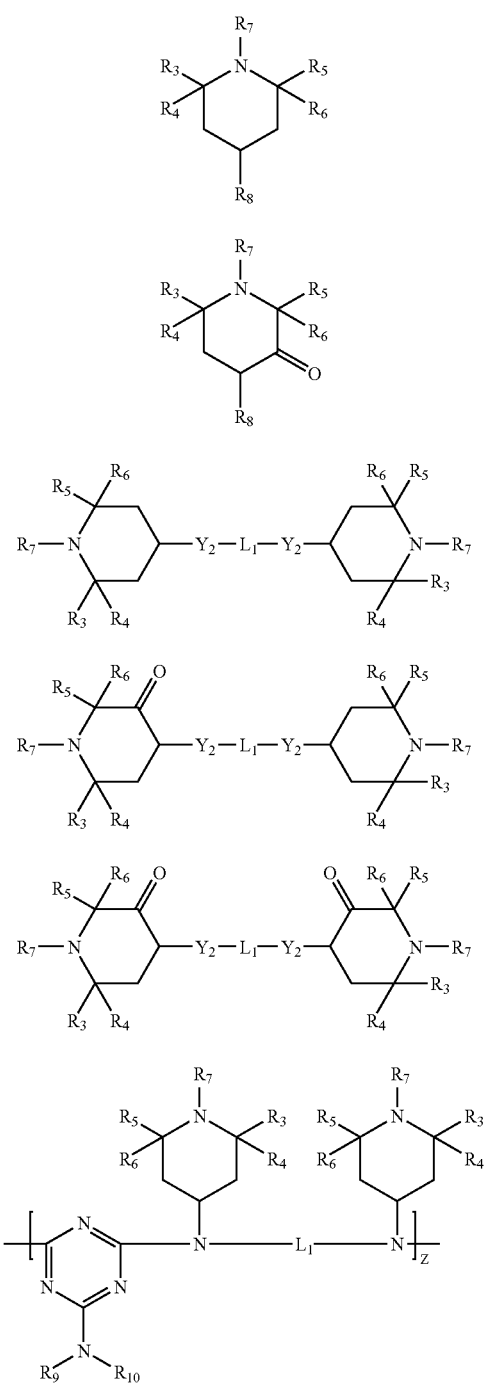
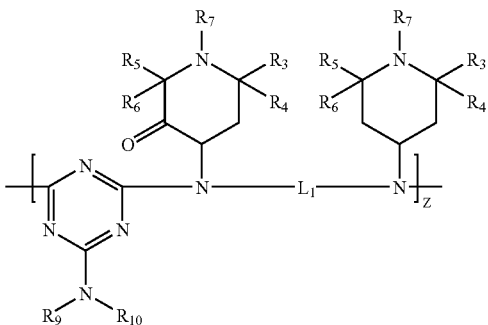
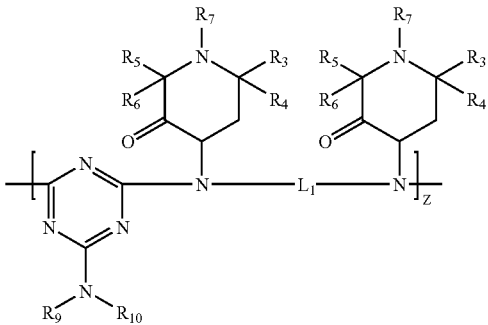
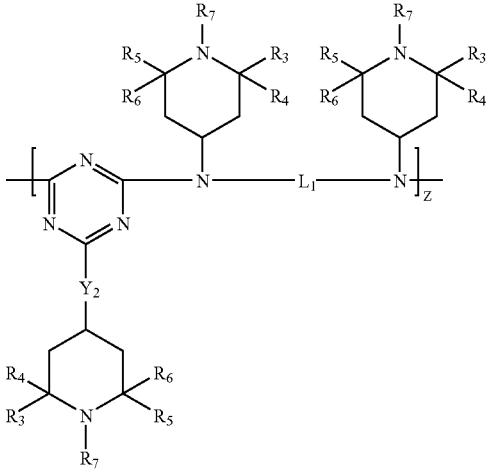
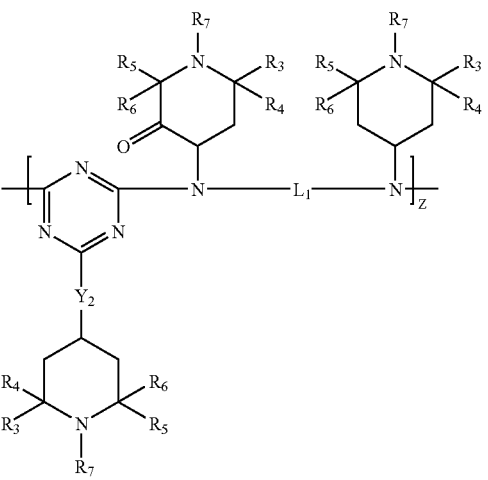

-continued

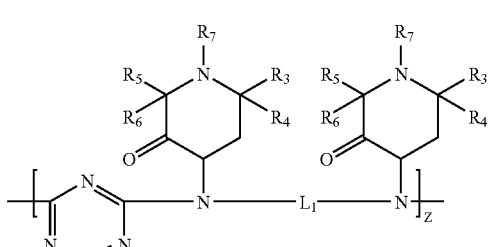
(11)

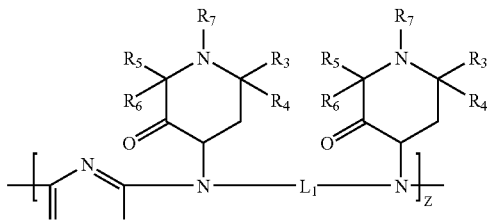
(12)

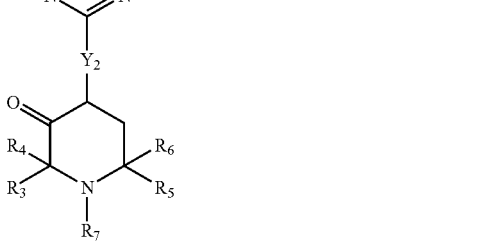
(13)

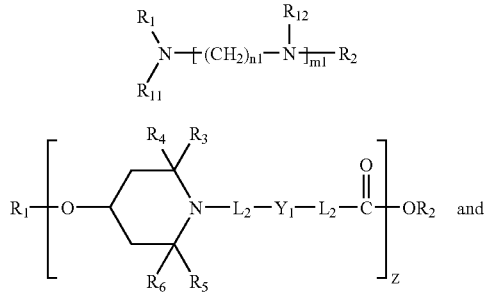
(14)

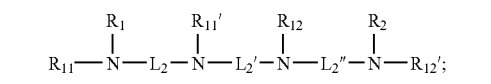
(15)

wherein
- $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_3$, $R_4$, $R_5$, and $R_6$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;
- $R_7$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;
- $R_8$ is selected from hydrogen; $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_1$ or a succinimido group having the formula

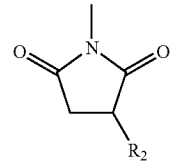

- $R_9$ and $R_{10}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl; $R_9$ and $R_{10}$ may collectively represent a divalent group forming a ring with the nitrogen atom to which they are attached, e.g., morpholino, piperidino and the like;
- $L_1$ is a divalent linking group selected from $C_2$-$C_{22}$-alkylene; —$(CH_2CH_2—Y_1)_{1-3}$—$CH_2CH_2$—; $C_3$-$C_8$-cycloalkylene; arylene; or —$CO$-$L_2$-$OC$—;
- $L_2$, $L_2'$ and $L_2''$ are independently selected from $C_1$-$C_{22}$-alkylene, arylene, —$(CH_2CH_2—Y_1)_{1-3}$—$CH_2CH_2$— and $C_3$-$C_8$-cycloalkylene;
- $Y_1$ is selected from —$OC(O)$—, —$NHC(O)$—, —$O$—, —$S$—, —$N(R_1)$—;
- $Y_2$ is selected from —$O$— or —$N(R_1)$—;
- Z is a positive integer of up to about 20, preferably up to about 6;
- m1 is selected from 0 to about 10;
- n1 is a positive integer selected from 2 to about 12;
- $R_{11}$, $R_{11'}$, $R_{12}$, and $R_{12'}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A;

wherein radical A for $R_{11}$, $R_{11'}$, $R_{12}$, and $R_{12'}$ are independently selected from the following structures:

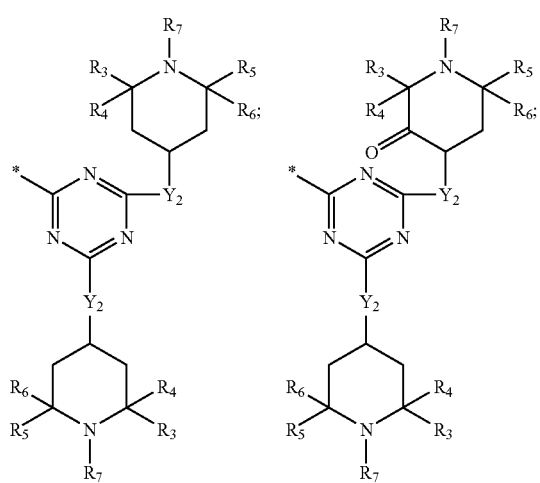

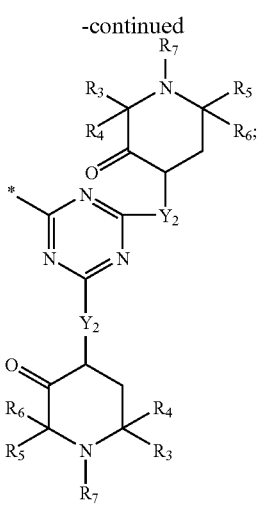

Radical A structures wherein * designates the position of attachment;

wherein at least one of $R_{11}$, $R_{11'}$, $R_{12}$, and $R_{12'}$ is an A radical; and wherein the ratio of the number of phosphorus atoms in the acidic phosphorus-containing compound to the number of basic nitrogen atoms in the HALS is about 0.25 to about 2, preferably from about 0.5 to about 1.1

The term "$C_1$-$C_{22}$-alkyl" denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$ alkanoyloxy and the like.

The term "$C_3$-$C_8$-cycloalkyl" is used to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, halogen, and the like.

The term "aryl" is used to denote an aromatic radical containing 6, 10 or 14 carbon atoms in the conjugated aromatic ring structure and these radicals substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; halogen and the like; $C_3$-$C_8$-cycloalkyl; halogen; hydroxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —O—$C_1$-$C_6$-alkyl and —OCO$C_1$-$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, acetyloxy and propionyloxy. The term "halogen" is used to represent fluorine, chlorine, bromine, and iodine; however, chlorine and bromine are preferred.

The term "$C_2$-$C_{22}$-alkylene" is used to denote a divalent hydrocarbon radical that contains from two to twenty-two carbons and which may be straight or branched chain and which may be substituted with one or more substituents selected from hydroxy, halogen, $C_1$-$C_6$-alkoxy, $C_2$-$C_6$-alkanolyloxy and aryl. The term "$C_3$-$C_8$-cycloalkylene" is used to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$-alkyl, $C_1$-$C_6$-alkoxy and halogen.

The salt of component (B) of the novel compositions provided by the present invention may be prepared by bringing together the acidic phosphorus-containing compound and the hindered amine light stabilizer in a suitable manner. A suitable manner is any procedure that involves contacting the acidic phosphorus-containing acid with the hindered amine light stabilizer. For example, the acidic phosphorus-containing compound and the hindered amine light stabilizer may be dissolved in an appropriate solvents and the solutions mixed followed by precipitation of the reaction product; mixing the phosphorus-containing acid and the hindered amine light stabilizer without solvent; and the like.

The ratio of the number of phosphorus atoms in the acidic phosphorus-containing compound to the number of basic nitrogen atoms in the hindered amine light stabilizer may be in the range of about 0.05 to about 2, preferably from about 0.25 to about 1.1. Compositions that contain a large excess of unreacted phosphorus-containing acidic compounds may result in corrosion of process equipment during concentrate manufacture and have a negative effect on the hydrolytic stability of the polymer.

The salt or salts constituting component (B) of our novel compositions typically is present in concentrations ranging from about 0.01 to about 0.25 weight percent based on the total weight of the composition, i.e., the total weight of the component (A) polycarbonate, the salt and any additional components present, such as stabilizers and pigments and colorants. Concentrations of salt (B) within this range typically are effective to improve the hydrolytic stability of polycarbonates. The concentration of the salt(s) preferably is about 0.05 to 0.15 weight percent (same basis).

Although polycarbonates are not commonly made using metal catalysts, it is possible. The polycarbonate may contain metal catalyst residues in 10 to 200 ppmw. Metal catalyst residues in concentrations of about 20 to 100 ppmw are more typical. An addition source of metal catalysts residue may be contributed by a polymer that is blended with the polycarbonate. For example, polyesters may contain 10 to 200 ppmw of metal catalyst residues. Corrosion of metal process equipment is an additional source of metal contaminants in polycarbonate component (A). For example, 304 and 316 stainless steels contain manganese, chromium and nickel. The salts of component (B) of the invention can be used in the polycarbonate compositions where the polycarbonates are either prepared by use of metal catalysts or contain metal contaminants or are blended with polymers comprising metal catalyst residues such that improved hydrolytic stability as well as improved color is provided to such polycarbonates.

The acidic phosphorus-containing compounds preferably are phosphorous acid, phosphoric acid and polyphosphoric acid, most preferably phosphorous acid.

Examples of suitable hindered amine light stabilizers (HALS) include, but are not limited to: Cyasorb UV-3346 (Cytec Industries, CAS# 90751-07-8), Cyasorb UV-3529 (Cytec Industries, CAS# 19309840-7), Cyasorb UV-3641 (Cytec Industries, CAS# 106917-30-0), Cyasorb UV-3581 (Cytec Industries, CAS# 79720-19-7), Cyasorb UV-3853 (Cytec Industries, CAS# 167078-06-0), Cyasorb UV-3853S (Cytec Industries, CAS# 24860-22-8), Tinuvin 622 (Ciba Specialty Chemicals, CAS# 65447-77-0), Tinuvin 770 (Ciba Specialty Chemicals, CAS# 52829-07-9), Tinuvin 144 (Ciba Specialty Chemicals, CAS# 63843-89-0), Tinuvin 123 (Ciba Specialty Chemicals, CAS# 129757-67-1), Chimassorb 944 (Ciba Specialty Chemicals, CAS# 71878-19-8), Chimassorb 119 (Ciba Specialty Chemicals, CAS# 10699043-6), Chimassorb 2020 (Ciba Specialty Chemicals, CAS# 192268-64-7), Lowilite 76 (Great Lakes Chemical Corp., CAS# 41556-26-7), Lowilite 62 (Great Lakes Chemical Corp., CAS# 65447-77-0), Lowilite 94 (Great Lakes Chemical Corp., CAS# 71878-19-8), Uvasil 299LM (Great Lakes Chemical Corp., CAS# 182635-99-0), and Uvasil 299HM (Great Lakes Chemical Corp., CAS# 182635-99-0), Dastib 1082 (Vocht a.s., CAS# 131290-28-3), Uvinul 4049H (BASF Corp., CAS# 109423-00-9), Uvinul 4050H (BASF Corp., CAS# 124172-53-8), Uvinul 5050H (BASF Corp., CAS# 199237-39-3), Mark LA 57 (Asahi Denka Co., Ltd., CAS# 64022-61-3), Mark LA 52 (Asahi Denka Co., Ltd., CAS# 91788-83-9), Mark LA 62 (Asahi Denka Co., Ltd., CAS# 107119-91-5), Mark LA 67 (Asahi Denka Co., Ltd., CAS# 100631434), Mark LA 63 (Asahi Denka Co., Ltd. Co., Ltd. Co., CAS# 115055-30-6), Mark LA 68 (Asahi Denka Co., Ltd., CAS# 10063144-5), Hostavin N 20 (Clariant Corp., CAS# 9507842-5), Hostavin N 24 (Clariant Corp., CAS# 85099-51-1, CAS# 85099-50-9), Hostavin N 30 (Clariant Corp., CAS# 78276-66-1), Diacetam-5 (GTPZAB Gigiena Truda, USSR, CAS# 76505-58-3), Uvasorb-HA 88 (3V Sigma, CAS# 136504-96-6), Goodrite UV-3034 (BF Goodrich Chemical Co., CAS# 71029-16-8), Goodrite UV-3150 (BF Goodrich Chemical Co., CAS# 96204-36-3), Goodrite UV-3159 (BF Goodrich Chemical Co., CAS# 130277-45-1), Sanduvor 3050 (Clariant Corp., CAS# 85099-51-0), Sanduvor PR-31 (Clariant Corp., CAS# 147783-69-5), UV Check AM806 (Ferro Corp., CAS# 154636-12-1), Sumisorb TM-061 (Sumitomo Chemical Company, CAS# 84214-94-8), Sumisorb LS-060 (Sumitomo Chemical Company, CAS# 99473-08-2), Uvasil 299 LM (Great Lakes Chemical Corp., CAS# 164648-93-5), Uvasil 299 HM (Great Lakes Chemical Corp., CAS# 164648-93-5), Nylostab S-EED (Clariant Corp., CAS# 42774-15-2). Additional preferred hindered amine light stabilizer may be listed in the *Plastic Additives Handbook 5th Edition* (Hanser Gardner Publications, Inc., Cincinnati, Ohio, USA, 2001).

Chimassorb 944 (Ciba Specialty Chemicals, CAS# 71878-19-8), Cyasorb UV-3529 (Cytec Industries, CAS# 193098-40-7), Chimassorb 119 (Ciba Specialty Chemicals, CAS# 106990-43-6) and Tinuvin 770 (Ciba Specialty Chemicals, CAS# 52829-07-9) as described further herein in the Examples and any equivalents thereof are specific examples of the preferred hindered amine light stabilizers. Chimassorb 119® is another preferred HALS embodiment. The structure of Chimassorb 119® has previously been disclosed also in the *Journal of Materials Science* 36 (2001) 4419-4431, incorporated herein by reference. The chemical name for Chimassorb 119® as disclosed in the *Journal of Materials Science* 36 (2001) at 4419-4431 is 1,3,5-triazine-2,4,6-triamine, N,N'-1,2-ethane-diyl-bis[[[4,6-bis-[butyl-1,2,2,6,6,-pentamethyl-4-pipendinyl)amino]-1,3,5-triazine-2-yl]amino]-3,1-pro-panediyl]]bis[N,N"-dibutyl N,N"bis-(1,2,2,6,6,-pentamethyl-4-pipendinyl)-. A group of preferred hindered amine light stabilizers include ones having above formulas (1), (2), (3), (4), (5), (6), (7), (8), (9), (10), (11) and (12) wherein radical $R_7$ is hydrogen or alkyl. The most preferred are high molecular weight HALS wherein the molecular weight is greater than about 1000 such as Cyasorb UV-3529 (Cytec Industries, CAS# 193098-40-7). The most preferred HALS correspond to formula (6) set forth above wherein $R_3=R_4=R_5=R_6=R_7=$ methyl, $(R_9)(R_{10})N$- collectively represent morpholino, $L_1$ is $C_1$ to $C_6$ alkylene, and Z is 1 to 6.

The term "polycarbonate" as used herein embraces those polycarbonates comprising repeating units or residues of the formula

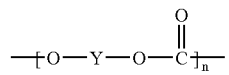

wherein Y is a divalent aromatic or aliphatic radical derived from a dihydroxyaromatic compound or a dihydroxyaliphatic compound of the formula HO—Y—OH. Typical dihydroxyaromatic compounds are 2,2-bis-(4-hydroxyphenyl) propane, also known as bisphenol A; bis(4-hydroxyphenyl) methane; 2,2-bis(4-hydroxy-3-methylphenyl)-propane; 4,4-bis(4-hydroxyphenyl)heptane; 2,2-(3,5,3',5'-tetrachloro-4,4'-dihydroxyphenyl)propane; 2,2-(3,5,3',5'-tetrabromo-4,4'-dihydroxyphenol)propane; 3,3'-dichloro-3,3'-dichloro-4,4'-dihydroxydiphenyl)methane; 2,2'-dihydroxyphenylsulfone, and 2,2'-dihydroxylphenylsulfide. Most preferably, HO—Y—OH is 2,2-bis-(4-hydroxyphenyl)propyl, in which case, the polycarbonate is a "bisphenol A polycarbonate". Examples of dihydroxyaliphatic compounds include 1,4-cyclohexanedimethanol, 1,2-propanediol, 1,3-propanediol, 1,4-butanediol, 2,2-dimethyl-1,3-propanediol, 1,6-hexanediol, 2,6-decahydronaphthalenedimethanol, 1,2-cyclohexanediol, 1,4-cyclohexanediol, 1,2-cyclohexanedimethanol, 1,3-cyclohexanedimethanol, isosorbide, 4,4'-isopropylidenedicyclohexanol, 2,2,4,4-tetramethylcyclobutane-1,2-diol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms. Branched polycarbonates are also useful in the present invention.

The polycarbonates comprising component (A) of the above-described embodiment of the present invention may be prepared according to known procedures by reacting the dihydroxyaromatic compound with a carbonate precursor such as phosgene, a haloformate or a carbonate ester, a molecular weight regulator, an acid acceptor and a catalyst. Methods for preparing polycarbonates are known in the art and are described, for example, in U.S. Pat. No. 4,452,933, which is hereby incorporated by reference herein.

Examples of suitable carbonate precursors include carbonyl bromide, carbonyl chloride, and mixtures thereof; diphenyl carbonate; a di(halophenyl)carbonate, e.g., di(trichlorophenyl) carbonate, di(tribromophenyl) carbonate, and the like; di(alkylphenyl)carbonate, e.g., di(tolyl)carbonate; di(naphthyl)carbonate; di(chloronaphthyl)carbonate, or mixtures thereof; and bis-haloformates of dihydric phenols.

Examples of suitable molecular weight regulators include phenol, cyclohexanol, methanol, alkylated phenols, such as octylphenol, para-tertiary-butylphenol, and the like. The preferred molecular weight regulator is phenol or an alkylated phenol.

The acid acceptor may be either an organic or an inorganic acid acceptor. A suitable organic acid acceptor is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalysts that can be used are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonate of component (A) also may be a copolyestercarbonate such as those described in U.S. Pat. Nos. 3,169,121; 3,207,814; 4,194,038; 4,156,069; 4,430,484, 4,465,820, and 4,981,898, all of which are incorporated by reference herein.

Copolyestercarbonates useful in this invention are available commercially. They are typically obtained by the reaction of at least one dihydroxyaromatic compound with a mixture of phosgene and at least one dicarboxylic acid chloride, especially isophthaloyl chloride, terephthaloyl chloride, or both.

The present invention provides polycarbonates that exhibit improved hydrolytic stability. The acidic phosphorus-containing compound salts of suitable hindered amine light stabilizer [Component (B)] are useful in providing that hydrolytic stability.

Another embodiment of the present invention is a polymer concentrate comprising:
(A) at least one polycarbonate; and
(B) up to about 10 weight percent, preferably about 5 to 10 weight percent, based on the total weight of the polycarbonate of at least one salt prepared by the reaction of one or more acidic phosphorus-containing compounds and one or more hindered amine light stabilizers.

The compositions of the present invention also may contain one or more compounds selected from the group consisting of (C) water, (D) colorants and pigments such as organic colorants, inorganic colorants and or white pigments such as $TiO_2$, ZnO and baryta, (E) other additives such as impact modifiers, plasticizers, halogenated flame-retardants, fillers, nonhalogenated flame-retardants, synergists, processing aids, phosphite stabilizers, phosphonite stabilizers and other stabilizers known to one skilled in the art; and (F) a recycled polymer.

The terms "phosphite stabilizers" and "phosphonite stabilizers" refer to secondary antioxidants that are known to those skilled in the art and may be represented by the structures listed on pages 109-112 in the *Plastic Additives Handbook 5th Edition* (Hanser Gardner Publications, Inc., Cincinnati, Ohio, USA, 2001), incorporated herein by reference in its entirety. Some common phosphite stabilizers are as follows: Ultranox 626 (GE Specialty Chemicals, CAS# 26741-53-7), Irgafos 168 (Ciba Specialty Chemicals, CAS# 31570-044), Weston 619 (GE Specialty Chemicals, CAS# 3806-34-6) and Doverphos S-9228 (Dover Chemicals, CAS# 154862-43-8).

The term "halogenated flame-retardants" is defined as compounds that can contain one or more of the following: fluorine, chlorine, bromine, and iodine, which act in such a way as to decrease the flammability of the polymer composition. More preferred are compounds that contain bromine such as brominated polycarbonate, brominated polystyrene, and the like.

Salts of phosphorus-containing acids and hindered amine light stabilizers, as defined herein, may reduce the amount of corrosion to process equipment as compared to some of the hydrolysis products of commercial phosphites, phosphorous acid, phosphoric acid, and polyphosphoric acid, thereby improving the color of the polymer composition and improving the lifetime of the process equipment.

The compositions provided by the present invention are useful for improving the properties of heavy-gauge sheet, cap layers for extruded sheet, cap layers for extruded films, thermoformable sheeting products, injection molded products, thin films, thick films, articles made using thin films, articles using from thick films, articles made using heavy gauge sheet, multilayer films, twin-wall sheet, triple wall sheet and the like.

This invention is further illustrated by the following examples of preferred embodiments thereof, although it will be understood that these examples are included merely for purposes of illustration and are not intended to limit the scope of the invention unless otherwise specifically indicated. Unless otherwise indicated, all weight percentages are based on the total weight of the polymer composition and all molecular weights are weight average molecular weights. Also, all percentages are by weight unless otherwise indicated. Wherever an R group, L group, Y group, Z group, m group or n group is defined herein, the definition for a particular group remains the same throughout this description regardless of whether it is used for multiple formulas or types of compounds unless otherwise specified.

EXAMPLES

Experimental Conditions:

In the examples, the following procedures were followed. To evaluate the effect of additives on hydrolytic stability of polycarbonate-polyester blends, samples were cut from 20-mil film and then exposed to 70° C. and 100% relative humidity by suspending the films in the vapor space of sealed jars containing a small amount of water and placed inside a forced air oven set at 70° C. Small samples were subsequently taken periodically and the molecular weight distribution for the polyester and polycarbonate components determined using gel permeation chromatography (GPC). The GPC method for the polycarbonate fraction consisted of first immersing the blends in tetrahydrofuran to selectively extract the polycarbonate. The GPC system used to analyze the polycarbonate fraction consisted of a Perkin-Elmer LC-250 pump, a Perkin-Elmer LC-600 autosampler, and a Perkin-Elmer LC-235 photodiode array UV detector operated at 265 nm. The columns used were a Plgel 5-micron guard, a Mixed-C, and an Oligopore from Polymer Laboratories. The molecular weight distribution was computed using monodisperse polystyrene standards for calibration and the Mark-Houwink constants for polystyrene and polycarbonate available in the literature. The solvent used for the polyester fraction was 70/30-v/v hexafluoroisopropanol/methylene chloride mixture, which is also a good solvent for polycarbonate. The GPC system used consisted of a Perkin-Elmer LC-250 pump, a Perkin-Elmer ISS-200 autosampler, and a Perkin-Elmer LC-95 UV/VIS detector operated at 285 nm. The absorption coefficient of terephthalate based copolyesters at 285 nm is considerably greater than the coefficient for polycarbonate so that the method selectively detects the polyester. The columns used were a Plgel 5-micron guard and a Mixed-C from Polymer Laboratories. The molecular weight distribution was computed using monodisperse polystyrene standards for calibration and Mark-Houwink constants for polystyrene measured in this solvent. Universal calibration constants for each polyester were chosen to yield accurate molecular weight values for a series of samples that were characterized by light scattering measurement.

The color of the polymer films is determined in a conventional manner using a HunterLab UltraScan Colorimeter manufactured by Hunter Associates Laboratory, Inc., Reston, Va. The instrument is operated using HunterLab Universal Software (version 3.8). Calibration and operation of the instrument is according to the HunterLab User Manual and is largely directed by the Universal Software. To reproduce the results on any colorimeter, run the instrument according to its instructions and use the following testing parameters: D65 Light Source (daylight, 6500° K color temperature), Reflectance Mode, Large Area View, Specular Included, CIE 10° Observer, Outputs are CIE L*, a*, b*. An increase in the positive b* value indicates yellowness, while a decrease in the numerical value of b* indicates a reduction in yellowness. Color measurement and practice are discussed in greater detail in Anni Berger-Schunn in *Practical Color Measurement*, Wiley, N.Y. pages 39-56 and 91-98 (1994). Preferably, for 20-mil films the b* value is less than +0.75, more preferably from about +0.25 to about −0.25.

Examples 1-5

These examples illustrate the detrimental effect of commercial phosphite stabilizers on the hydrolytic stability of polycarbonate-polyester blends. The polyester, polyester A, is a polyester comprised of 74 mole percent terephthalic acid residues, 26 mole percent isophthalic acid residues and 100 mole percent 1,4-cyclohexanedimethanol residues having an inherent viscosity of about 0.74 and containing approximately 100 ppmw titanium metal and the polycarbonate, polycarbonate A, is a bisphenol A polycarbonate supplied by Bayer as Makrolon 2608. The following commercial phosphites were utilized: Ultranox 626 (GE Specialty Chemicals, CAS# 26741-53-7, bis(2,4-di-t-butylphenyl) pentaerythritol diphosphite), Ultranox 641 (GE Specialty Chemicals, CAS# 26741-53-7, 2,4,6-tri-tert-butylphenyl-2-butyl-2-ethyl-1,3-propanediol phosphite), Weston 619 (GE Specialty Chemicals, CAS# 3806-34-6, distearyl pentaerythritol diphosphite) and Doverphos S-9228 (Dover Chemicals, CAS# 15486243-8, bis(2,4-dicumylphenyl) pentaerythritol diphosphite). The phosphite stabilizers were precompounded with polyester A using an 19-mm APV twin-screw extruder at 250° C., 200 RPM, at a rate of about 5 lbs/hr to produce concentrates containing 5 percent phosphite stabilizer. Blends of polyester A and polycarbonate A were prepared by melt blending a 3:1 weight ratio of polyester A with polycarbonate A, respectively, with 0.5 weight percent of the various phosphite stabilizers as reported in Table 1. The blends were prepared as 20-mil extrusion cast films using a 1" Killion single-screw extruder at 275° C. and 70 RPM. The films were subsequently conditioned at 70° C. and 100% relative humidity for up to 3 weeks and the molecular weight of the polyester A and polycarbonate A components determined by GPC as previously described. The results are shown in Table 1. As shown in Table 1, the addition of a phosphite stabilizer improves the blend color (i.e. less yellow as represented by lower b*); however, the phosphites are detrimental to hydrolytic stability of the blend as indicated by significant decrease in molecular weight for both the polyester A and polycarbonate A components.

TABLE 1

| | | 20-mil | Hydrolytic Stability @ 70° C. and 100% Relative Humidity | | | | |
|---|---|---|---|---|---|---|---|
| Example | Phosphite | CIE b* | Exposure (weeks) | polyester A Mw | polyester A ΔMw (%) | polycarbonate A Mw | polycarbonate A ΔMw (%) |
| 1 | No Stabilizer | 9.6 | 0 | 23297 | 0.0 | 13582 | 0.0 |
| | | | 1 | 23595 | 1.3 | 12446 | −8.4 |
| | | | 2 | 23408 | 0.5 | 14007 | 3.1 |
| | | | 3 | 23528 | 1.0 | 13391 | −1.4 |
| 2 | Weston 619 | −0.1 | 0 | 23123 | 0.0 | 20723 | 0.0 |
| | | | 1 | 21337 | −7.7 | 14339 | −30.8 |
| | | | 2 | 20532 | −11.2 | 12239 | −40.9 |
| | | | 3 | 20317 | −12.1 | 9919 | −52.1 |
| 3 | Ultranox 626 | 0.5 | 0 | 22559 | 0.0 | 21684 | 0.0 |
| | | | 1 | 20813 | −7.7 | 14663 | −32.4 |
| | | | 2 | 20452 | −9.3 | 12888 | −40.6 |
| | | | 3 | 20129 | −10.8 | 11102 | −48.8 |
| 4 | Doverphos 9228 | 0.4 | 0 | 22339 | 0.0 | 20935 | 0.0 |
| | | | 1 | 20937 | −6.3 | 14860 | −29.0 |
| | | | 2 | 20112 | −10.0 | 13385 | −36.1 |
| | | | 3 | 20641 | −7.6 | 11561 | −44.8 |
| 5 | Ultranox 641 | 0.6 | 0 | 22651 | 0.0 | 20128 | 0.0 |
| | | | 1 | 21367 | −5.7 | 12889 | −36.0 |
| | | | 2 | 20461 | −9.7 | 11244 | −44.1 |
| | | | 3 | 20574 | −9.2 | 9722 | −51.7 |

Weston 619 is distearyl pentaerythritol diphosphite.
Ultranox 626 is Bis(2,4-di-t-butylphenyll) pentaerythritol diphosphite.
Doverphos 9228 is Bis(2,4-dicumylphenyll) pentaerythritol diphosphite.
Ultranox 641 is 2,4,6 tri-t-butylphenyl 2 butyl 2 ethyl 1,3 propane diol phosphite.

Examples 6-19

Phosphorous Acid Salts of Hindered Amine Light Stabilizers (HALS)

These examples illustrate improved hydrolytic stability for polycarbonate-polyester blends containing phosphorous acid salts of HALS compared to blends containing phosphorous acid. The polyester, polyester B, comprised of 100 mole percent terephthalic acid residues, 62 mole percent cyclohexandimethanol and 38 mole percent ethylene glycol residues having an inherent viscosity of about 0.7 and the polycarbonate, polycarbonate B, is a bisphenol A polycarbonate (tradename Makrolon 1804 (Bayer Corporation) believed to contain about 0.25 wt % of a ultraviolet light absorbing compound and a blue toner colorant. A 70:30 ratio by weight blend of polyester B and polycarbonate B (70:30 blend by weight) were melt blended with 0.03 weight percent and 0.06 weight percent of phosphorous acid and the phosphorous acid salts described in Table 2. The phosphorous acid salts were compounded with polyester B using a WP 30-mm twin-screw extruder at 250° C., 250 RPM at a rate of about 40 lbs/hr to produce concentrates containing 5 percent of the phosphorous acid salt. The polyester B and polycarbonate B blends were subsequently prepared as 20-mil extrusion cast films using a 1" Killion single-screw extruder at 275° C. and 70 RPM.

Example 6

No Stabilizer (Comparative Example)

A blend was prepared as described previously without any added stabilizer.

Example 7

Phosphorous Acid (Comparative Example)

A phosphorous acid concentrate was prepared by mixing pellets of polyester B with a 45 percent weight percent aqueous solution of phosphorous acid and then drying under vacuum to produce a concentrate containing 2.5 percent phosphorous acid. Blends were prepared as described previously with 0.03 weight percent and 0.06 weight percent phosphorous acid.

Examples 8-10

Phosphorous Acid Salts of Cyasorb UV-3529

Phosphorous acid and Cyasorb UV-3529 (supplied by Cytec Industries, Inc.), which is a polymeric hindered amine light stabilizer (HALS) believed to conform generally to the compounds of amine formula (6) set forth above whrein $R_3=R_4=R_5=R_6=R_7$=methyl; $L_1$ is hexamethylene; and $(R_9)(R_{10})N$— collectively represent a morpholino group, were added to a large mortar and pestle according to Table 2. The solids were ground to a fine powder thereby forming a salt and placed into a vacuum oven overnight at 70° C. with a slight ingress of dry nitrogen. The solid was allowed to cool to room temperature and ground again to a fine powder using mortar and pestle. Blends were prepared as described previously with 0.03 and 0.06 weight percent of each phosphorous acid salt.

TABLE 2

| Example | Phosphorous Acid (g) | Cyasorb 3529 (g) |
|---|---|---|
| 8 | 32.76 | 200 |
| 9 | 65.45 | 200 |
| 10 | 98.18 | 200 |

Examples 11-14

Phosphorous Acid Salts of Chimassorb 119

Phosphorous acid and Chimassorb 119 were added to a large mortar and pestle according to Table 3. The chemical name for Chimassorb 119® as disclosed in the *Journal of Materials Science* 36 (2001) at 4419-4431 is 1,3,5-triazine-2,4,6-triamine, N,N'-1,2-ethane-diyl-bis[[[4,6-bis-[butyl-1,2,2,6,6,-pentamethyl-4-piperidinyl)amino]-1,3,5-triazine-2-yl]amino]-3,1-propanediyl]]bis[N,N"-dibutyl N,N"bis-(1,2,2,6,6,-pentamethyl-4-piperidinyl)-. The solids were ground to a fine powder and placed into a vacuum oven overnight at 70° C. with a slight ingress of dry nitrogen. The solid was allowed to cool to room temperature and ground again to a fine powder using mortar and pestle. Blends were prepared as described previously with 0.03 and 0.06 weight percent of each phosphorous acid salt.

TABLE 3

| Example | Phosphorous Acid (g) | Chimassorb 119 (g) |
|---|---|---|
| 11 | 37.19 | 200 |
| 12 | 74.38 | 200 |
| 13 | 111.57 | 200 |
| 14 | 148.76 | 200 |

Example 15-17

Phosphorous Acid Salts of Tinuvin 770

To a clean dry 5 L three neck round-bottomed flask equipped with a mechanical stirrer, thermocouple, heating mantle and addition funnel was added Tinuvin 770, as described in Table 4 and 1.5 L of isopropyl alcohol. (Tinuvin 770 is a hindered amine light stabilizer believed to conform generally to the compounds of amine formula (3) set forth above wherein $R_3=R_4=R_5=R_6$=methyl; $R_7$ is hydrogen; $Y_2$ is —OCO—; and $L_1$ is octamethylene.) The mixture was heated to 30° C. and stirred until a homogeneous solution was obtained. To a clean dry 2 L beaker was added phosphorous acid as given in Table 5 and 1 L of isopropyl alcohol. The mixture was stirred until a homogeneous solution was obtained. The phosphorous acid solution was added to the addition funnel and delivered to the stirred reaction vessel at a rate of about 50 mL/min. A solid formed as the phosphorous acid solution was added. Stirring was continued at about 30° C. for 1 h upon complete addition of the phosphorous acid solution. The reaction mixture was allowed to cool to room temperature and the product was further precipitated by adding half of the material to each of two 4 L beakers that contained 1.5 L of rapidly stirred heptane (equipped with a mechanical stirrer). The solid material was collected by suction filtration, washed with 500 mL of heptane, and then allowed to dry on the filter paper overnight. The solid cake was broken up, placed into a 12"×7"×2" aluminum pan and dried in a vacuum oven at 70° C. at about 15 mm of Hg with a slight ingress of dry nitrogen for 2 days. Blends were prepared as described previously with 0.03 and 0.06 weight percent of each phosphorous acid salt.

TABLE 4

| Example | Phosphorous Acid g (mole) | Tinuvin 770 g (mole) | Yield (% of theoretical) |
|---|---|---|---|
| 15 | 450 (0.94) | 76.71 (0.94) | 90 |
| 16 | 425 (0.88) | 106.68 (1.32) | 97 |
| 17 | 400 (0.83) | 143.20 (1.75) | 97 |

Example 18

Phosphorous Acid Salt of Cyasorb UV-3346

To a clean dry 5 L three neck round-bottomed flask equipped with a mechanical stirrer and addition funnel was added 200 g of Cyasorb UV-3346 (HALS, supplied by Cytec Industries, Inc.) and 1 kg of toluene. Cyasorb UV-3346 is a polymeric hindered amine light stabilizer believed to conform generally to the compounds of amine formula (6) set forth above $R_3=R_4=R_5=R_6=$methyl; $R_7=$hydrogen; $L_1$ is hexamethylene; and $(R_9)(R_{10})$N— collectively represent a morpholino group. The mixture was stirred until a homogeneous solution was obtained. To a clean dry 1 L beaker was added 30.69 g of phosphorous acid and 200 g of isopropyl alcohol. The mixture was stirred until a homogeneous solution was obtained. The phosphorous acid solution was added to the addition funnel and delivered to the stirred reaction vessel at a rate of about 13 mL/min. A precipitate began to form. Stirring was continued for about 30 min upon complete addition of the phosphorous acid solution. Heptane (1 kg) was added to the reaction mixture at a dropwise rate to precipitate the product. The solid material was collected by suction filtration and washed twice with 100 mL of heptane, then allowed to dry on the filter paper overnight. The solid cake was broken up, placed into a 12"×7"×2" aluminum pan, and dried in a vacuum oven at 70° C. at about 15 mm of Hg with a slight ingress of dry nitrogen for 24 h to give 230.05 g of material (100% of theoretical yield). Blends were prepared as described previously with 0.03 and 0.06 weight percent the phosphorous acid salt.

Example 19

Phosphorous Acid Salt of Cyasorb UV-3346

To a clean dry 5 L three neck round-bottomed flask equipped with a mechanical stirrer and addition funnel was added 200 g of Cyasorb UV-3346, which is previously described in Example 18, and 1 kg of toluene. The mixture was stirred until a homogeneous solution was obtained. To a clean dry 1 L beaker was added 61.37 g of phosphorous acid and 400 g of isopropyl alcohol. The mixture was stirred until a homogeneous solution was obtained. The phosphorous acid solution was added to the addition funnel and delivered to the stirred reaction vessel at a rate of about 10 mL/min. A precipitate began to form. Stirring was continued for about 30 min upon complete addition of the phosphorous acid solution. Heptane (1 kg) was added to the reaction mixture at a dropwise rate to precipitate the product. The solid material was collected by suction filtration and washed twice with 100 mL of heptane, then allowed to dry on the filter paper overnight. The solid cake was broken up, placed into a 12"×7"×2" aluminum pan, and dried in a vacuum oven at 70° C. at about 15 mm of Hg with a slight ingress of dry nitrogen for 24 h to give 259.09 g of material (100% of theoretical yield). Blends were prepared as described previously with 0.03 and 0.06 weight percent the phosphorous acid salt.

The blends described in Examples 6-19 were evaluated for hydrolytic stability at 70° C. and 100% relative humidity for up to 6 weeks as described previously. The results for blends containing 0.03 and 0.06 weight percent phosphorous acid salt are shown in Tables 5 and 6 respectively. As shown, the addition of phosphorous acid or phosphorous acid salts of HALS dramatically improves the color (i.e. less yellow as represented by lower b*) of polycarbonate-polyester blends compared to the blends without a phosphorus-containing compound (Example 6). Example 7 serves to illustrate the detrimental effect of phosphorous acid on the hydrolytic stability of the blend components similar to the results shown previously in Examples 2-5 that contained commercial phosphite stabilizers. However, the hydrolytic stability of the blend components is significantly improved for the blends containing phosphorous acid salts of HALS (Examples 8-19) compared to the blends containing phosphorous acid only (Example 7).

TABLE 5

Hydrolytic Stability of Blends with 0.03% by weight phosphorous acid salts

| | | Polyester B | | | | Polycarbonate B | | | |
|---|---|---|---|---|---|---|---|---|---|
| Example | CIE b* | Initial Mw | ΔMw (%) 2 wks | ΔMw (%) 4 wks | ΔMw (%) 6 wks | Initial Mw | ΔMw (%) 2 wks | ΔMw (%) 4 wks | ΔMw (%) 6 wks |
| 6 | 0.9 | 29111 | −0.6 | −0.6 | −1.9 | 22415 | −5.5 | −9.2 | −10.5 |
| 7 | −0.1 | 28379 | −3.0 | −6.9 | −11.4 | 21990 | −14.3 | −34.6 | −37.3 |
| 8 | 0.2 | 30055 | 0.7 | −0.3 | −1.7 | 21453 | 0.9 | −9.0 | −12.2 |
| 9 | −0.1 | 29695 | 1.8 | 0.7 | −1.6 | 20979 | 0.8 | −9.3 | −10.2 |
| 10 | −0.1 | 29492 | 1.2 | 0.4 | −1.9 | 22741 | −10.6 | −16.8 | −18.9 |
| 11 | 0.5 | 30208 | −1.1 | −1.2 | −2.1 | 22626 | −4.8 | −15.0 | −13.3 |
| 12 | 03 | 29089 | 2.3 | 1.8 | 0.1 | 22191 | −6.7 | −17.9 | −17.5 |
| 13 | 0.2 | 29321 | −0.2 | −1.5 | −3.1 | 22220 | −4.8 | −19.2 | −23.0 |
| 14 | 0.0 | 29067 | 0.2 | −2.1 | −4.9 | 22145 | −10.7 | −20.1 | −23.6 |
| 15 | 0.1 | 29486 | 0.5 | −0.4 | 0.0 | 22370 | −11.1 | −20.7 | −20.0 |
| 16 | 0.0 | 29376 | 1.0 | 0.8 | −0.1 | 22220 | −11.9 | −19.4 | −20.8 |

TABLE 5-continued

Hydrolytic Stability of Blends with 0.03% by weight phosphorous acid salts

| | | Polyester B | | | | Polycarbonate B | | | |
|---|---|---|---|---|---|---|---|---|---|
| Example | CIE b* | Initial Mw | ΔMw (%) 2 wks | ΔMw (%) 4 wks | ΔMw (%) 6 wks | Initial Mw | ΔMw (%) 2 wks | ΔMw (%) 4 wks | ΔMw (%) 6 wks |
| 17 | −0.1 | 29746 | −1.3 | −1.0 | −2.5 | 21808 | −14.3 | −16.6 | −30.7 |
| 18 | 0.1 | 30093 | 0.6 | −1.0 | −2.0 | 22463 | −7.5 | −14.4 | −17.9 |
| 19 | 0.1 | 29609 | 1.3 | 0.7 | −2.3 | 23009 | −12.2 | −15.0 | −17.4 |

TABLE 6

Hydrolytic Stability of Blends with 0.06 Weight Percent Phosphorous Acid Salts

| | | Polyester B | | | | Polycarbonate B | | | |
|---|---|---|---|---|---|---|---|---|---|
| Example | CIE b* | Initial Mw | ΔMw (%) 2 wks | ΔMw (%) 4 wks | ΔMw (%) 6 wks | Initial Mw | ΔMw (%) 2 wks | ΔMw (%) 4 wks | ΔMw (%) 6 wks |
| 6 | 0.9 | 29111 | −0.6 | −0.6 | −1.9 | 22415 | −5.5 | −9.2 | −10.5 |
| 7 | −0.2 | 28477 | −12.7 | −19.1 | −24.7 | 21518 | −27.8 | −53.1 | −55.4 |
| 8 | −0.2 | 29538 | 1.4 | 0.2 | −0.6 | 21717 | −6.8 | −15.0 | −15.3 |
| 9 | −0.2 | 30029 | 0.6 | −1.6 | −3.0 | 22270 | −4.5 | −17.1 | −16.2 |
| 10 | −0.1 | 29518 | 1.5 | 0.8 | −2.5 | 23287 | −13.8 | −21.7 | −22.2 |
| 11 | 0.1 | 29884 | 0.7 | −1.2 | −3.0 | 22665 | −13.6 | −17.2 | −19.3 |
| 12 | 0.0 | 29535 | −0.2 | −1.0 | −2.9 | 21764 | −3.5 | −19.2 | −19.1 |
| 13 | −0.1 | 29351 | −0.8 | −2.7 | −4.9 | 21614 | −9.6 | −16.2 | −24.8 |
| 14 | −0.1 | 29288 | −1.9 | −4.8 | −9.9 | 22072 | −16.6 | −27.1 | −31.0 |
| 15 | 0.0 | 29465 | 0.4 | −0.2 | −0.4 | 23459 | −21.4 | −27.8 | −31.3 |
| 16 | −0.1 | 29269 | 0.9 | 0.6 | −1.2 | 21965 | −12.1 | −23.8 | −29.8 |
| 17 | −0.1 | 29189 | 0.8 | 1.2 | −2.1 | 22114 | −24.4 | −30.6 | −33.7 |
| 18 | 0.1 | 29962 | −0.4 | 0.2 | −2.6 | 22278 | −4.1 | −12.0 | −15.5 |
| 19 | −0.1 | 29864 | 0.3 | −1.3 | −2.3 | 22057 | −4.5 | −9.7 | −18.4 |

Examples 20-22

Phosphorous Acid Salts Prepared by Mechanical and Organic Methods

These examples illustrate different methods of preparing the phosphorous acid salts. To a clean, dry 5 L three neck round-bottomed flask equipped with a mechanical stirrer and addition funnel was added 100 g of Cyasorb UV-3529, which is described in Examples 8-10, and 575 g of toluene. The mixture was stirred until a homogeneous solution was obtained. To a clean dry 2 L beaker was added 28.05 g (0.34 mol) of phosphorous acid and 575 g of isopropyl alcohol. The mixture was stirred until a homogeneous solution was obtained. The phosphorous acid solution was added to the addition funnel and delivered to the stirred reaction vessel over 2 h (added dropwise). Stirring was continued for about 30 min upon complete addition of the phosphorous acid solution. The reaction product was precipitated by adding half of the reaction mixture to each of two 4 L beakers that contained 2475 g of rapidly stirred heptane (equipped with a mechanical stirrer). The solid material was collected by suction filtration and washed with 500 mL of heptane then allowed to dry on the filter paper overnight. The solid cake was broken up, placed into a 12"×7"×2" aluminum pan and dried in a vacuum oven at 70° C. at about 150 torr with a slight ingress of dry nitrogen for 24 h to give 135.07 g of material (>100% of theory, slightly solvent wet).

Blends of polyester B and polycarbonate B (70:30 blend ratio by weight) were melt blended along with 0.1 weight percent of the phosphorous acid salt prepared by an organic method (Example 20), the phosphorous acid salt prepared by a mechanical method described in Example 9 (Example 21) and Weston 619 (Example 22) for comparison. The phosphorous acid salts and Weston 619 were compounded with polyester B using a 30-mm WP twin-screw extruder at 250° C., 250 RPM at a rate of about 40 lbs/hr to produce concentrates containing 5 percent of each additive. The blends were prepared as 20-mil extrusion cast films using a 1" Killion single-screw extruder at 275° C. and 70 RPM. The blends were evaluated for hydrolytic stability at 70° C. and 100% relative humidity for up to 6 weeks as described previously and the results are shown in Tables 7. The results show significantly improved hydrolytic stability for the blends containing the phosphorous acid salts whether prepared by an organic method (Example 20) or a mechanical method (Example 21) compared to the commercial phosphite stabilizer Weston 619 (Example 22).

TABLE 7

| | Polyester A | | | | Polycarbonate A | | | |
|---|---|---|---|---|---|---|---|---|
| Example | Initial Mw | ΔMw (%) 2 wks | ΔMw (%) 4 wks | ΔMw (%) 6 wks | Initial Mw | ΔMw (%) 2 wks | ΔMw (%) 4 wks | ΔMw (%) 6 wks |
| 20 | 27105 | −1.7 | −3.1 | 7.3 | 23287 | −8.4 | −21.6 | −25.5 |
| 21 | 26159 | 1.1 | −0.8 | 7.9 | 22538 | −8.1 | −18.2 | −24.0 |
| 22 | 25957 | −6.4 | −9.1 | −8.5 | 22308 | −25.7 | −40.3 | −49.0 |

The invention has been described in detail with particular reference to preferred embodiments thereof, but it will be understood that variations and modifications can be effected within the spirit and scope of the invention.

We claim:
1. A polymer composition comprising:
(A) at least one polycarbonate; and
(B) at least one salt prepared by the reaction of one or more acidic phosphorus-containing compounds with one or more hindered amine light stabilizers (HALS), wherein the HALS has the formula (15):

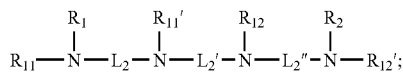

wherein
$R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
$L_2$, $L_2'$, and $L_2''$ are independently selected from $C_1$-$C_{22}$-alkylene, arylene, —($CH_2CH_2$—$Y_1$)$_{1-3}$—$CH_2CH_2$—, and $C_3$-$C_8$-cycloalkylene;
$Y_1$ is selected from —OC(O)—, —NHC(O)—, —O—, —S—, and —N($R_1$)—;
$R_{11}$, $R_{11'}$, $R_{12}$, and $R_{12'}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A;
wherein radical A for $R_{11}$, $R_{11'}$, $R_{12}$, and $R_{12'}$ is independently selected from the following structures:

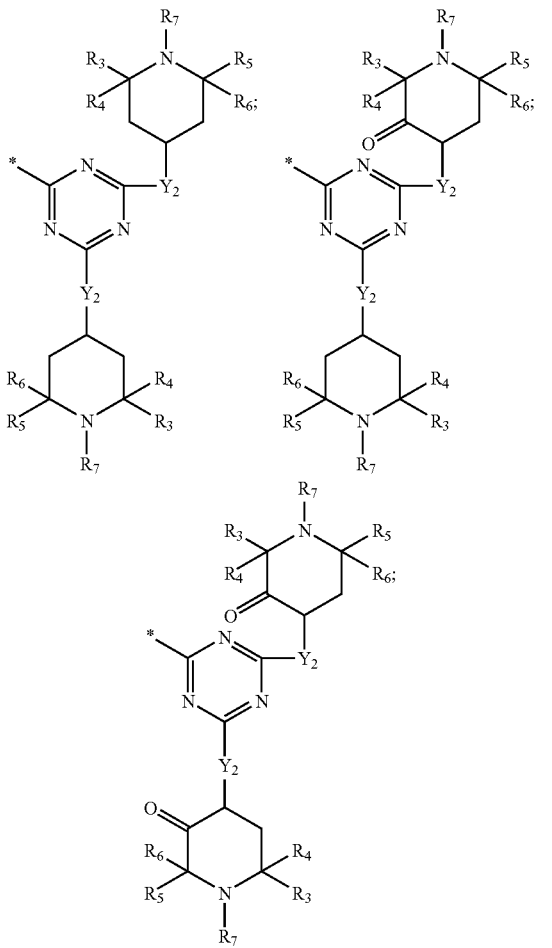

Radical A structures wherein * designates the position of attachment;
wherein at least one of $R_{11}$, $R_{11'}$, $R_{12}$, and $R_{12'}$ is a radical A; and
wherein the ratio of the number of phosphorus atoms in the acidic phosphorus-containing compound to the number of basic nitrogen atoms in the HALS is about 0.25 to about 2.

2. A polymer composition according to claim 1, wherein the acidic phosphorus compounds have one of the formulas (1)-(5):

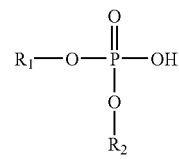

(1)

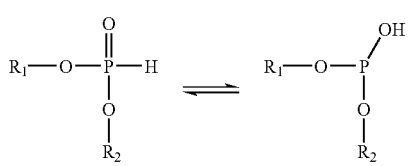

(2)

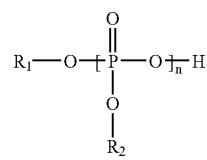

(3)

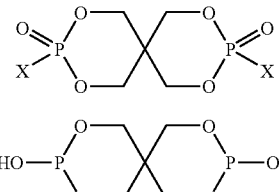

(4)

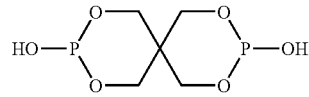

(5)

wherein
$R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
n is 2 to 500; and
X is selected from hydrogen and hydroxy.

3. A polymer composition according to claim 2, wherein the ratio of the number of phosphorus atoms in the acidic phosphorus-containing compound to the number of basic nitrogen atoms in the HALS is about 0.5 to about 1.1.

4. A polymer composition according to claim 1, wherein the acidic phosphorus-containing compounds are selected from phosphorous acid, phosphoric acid, and polyphosphoric acid.

5. A polymer composition according to claim 1, wherein the acidic phosphorus-containing compound is phosphorous acid.

6. A polymer composition according to claim 1, which comprises from about 0.01 to about 0.25 weight percent of component (B).

7. A polymer composition according to claim 1, which comprises from about 0.05 to about 0.15 weight percent of component (B).

* * * * *